(No Model.)

W. P. TOWNE.
COUPLING.

No. 303,075. Patented Aug. 5, 1884.

Witnesses
James R. Bowen
T. J. Keane

Inventor
William P. Towne,
by his attorneys,
Gifford & Brown

UNITED STATES PATENT OFFICE.

WILLIAM P. TOWNE, OF NEW YORK, N. Y., ASSIGNOR TO CHARLES HARRISON, OF SAME PLACE.

COUPLING.

SPECIFICATION forming part of Letters Patent No. 303,075, dated August 5, 1884.

Application filed February 25, 1884. (No model.)

*To all whom it may concern:*

Be it known that I, WILLIAM P. TOWNE, of New York, in the county of New York and State of New York, have invented a certain new and useful Improvement in Couplings, of which the following is a specification.

The object of my improvement is principally to provide a simple and cheap coupling whereby a pipe may be connected to a nozzle extending from or forming part of an earthenware bowl—such, for instance, as is used for a water-closet.

The improvement consists in the combination, with a nozzle or pipe provided with a laterally-extending flange, and a pipe also provided with a laterally-extending flange, of a yoke partially surrounding one part and fitting against its flange, arms extending from the yoke to the other part, and means for acting against the flange of the part last named, so as to draw the two parts together.

Figure 1:
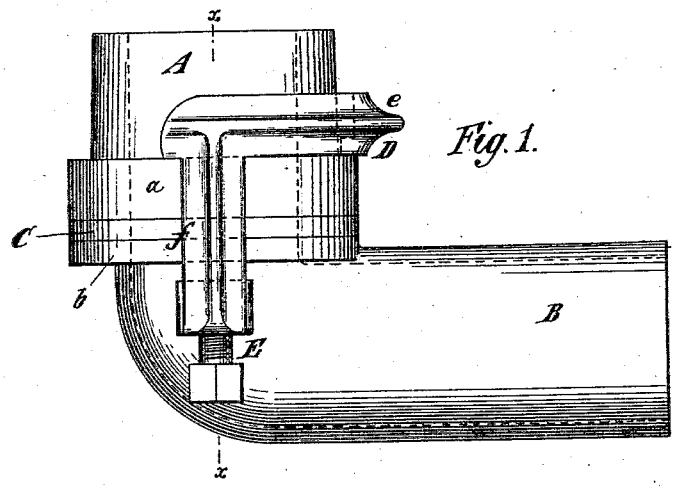
Figure 3:
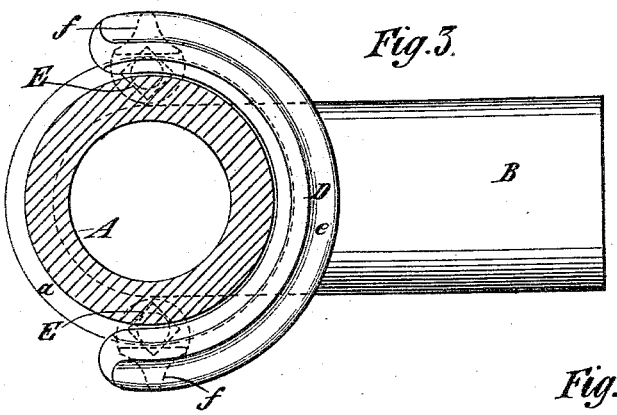
Figures 2, 4:
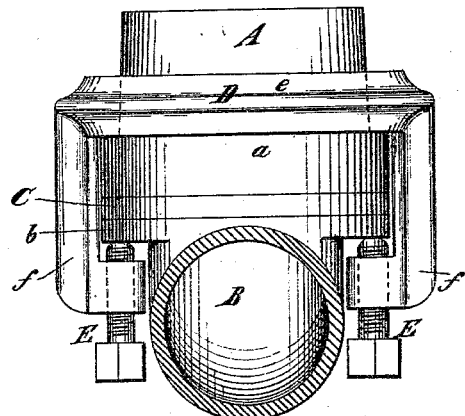

In the accompanying drawings, Figure 1 is a side view of a nozzle, a pipe, and a coupling embodying my improvement, and serving to fasten them together. The interior of the nozzle and pipe are indicated by dotted lines. Fig. 2 is a transverse section taken at the plane of the dotted line $x$ $x$, Fig. 1. Fig. 3 is a transverse section through a nozzle, looking toward the coupling; and Fig. 4 is a transverse section through the pipe, looking toward the coupling.

Similar letters of reference designate corresponding parts in all the figures.

A designates a nozzle, such as that which extends from an ordinary water-closet bowl to receive the flushing-water and conduct it into the bowl. It may be made integral with the bowl and of earthenware or other suitable material. At the outer end it is provided with a laterally-extending flange, $a$.

B designates a pipe or pipe-elbow, which may be made of metal. One end is bent around to fit the outer end of the nozzle A, and its main portion extends at about right angles to the said nozzle. Near the end which fits the nozzle a flange, $b$, extends laterally from it. I have shown the nozzle as provided at the outer end with a recess, $c$, and the pipe as provided with a rim, $d$, entering the recess $c$. Around the rim $d$ and between the flange $a$ of the nozzle A and the flange $b$ of the pipe B, a washer, C, of india-rubber or like material, is placed to prevent leakage.

D designates a coupling consisting of an approximately semicircular yoke, $e$, partially surrounding the nozzle A, and bearing against the back of the flange $a$, and arms $f$, extending from the yoke at the ends thereof. The outer ends of the arms $f$ of the coupling are turned inward, so as to lap or extend over the back of the flange $b$ of the pipe B. The inwardly-turned ends of the arms $f$ have tapped holes, in which are arranged screws E. The yoke may be fitted to the nozzle in any desirable position; but preferably it will be arranged in the position shown. It is slipped onto the nozzle laterally, with its arms straddling the pipe, and when it is in place the screws E are turned so that they will draw the nozzle and pipe tightly together. By turning the screws so as to relax the pressure exerted by them, the yoke may be slipped off sidewise and the nozzle and pipe separated.

I do not wish to confine myself to the use of any coupling for securing a pipe to a water-closet nozzle or to use with a bent pipe. In many cases my coupling could have its yoke fitted to a flanged pipe, and the screws would then act on a flange extending from a nozzle or other pipe.

What I claim as my invention, and desire to secure by Letters Patent, is—

1. The combination, with a nozzle or pipe provided with a laterally-extending flange and a pipe also provided with a laterally-extending flange, of a yoke partially surrounding one pipe, adapted to be slipped on and off the same in a direction transverse to the axis thereof, and fitting, when in place, against its flange, arms extending from the yoke to the other pipe, and adjustable devices for acting against the flange of the pipe last named so as to draw the two parts together, substantially as specified.

2. The combination of the nozzle A, provided with the flange $a$, the pipe B, provided with the flange $b$, the coupling D, consisting of the yoke $e$, partially surrounding the part A, and adapted to be slipped on and off the same in a direction transverse to the axis thereof, and arms $f$, provided with screws E, substantially as specified.

WM. P. TOWNE.

Witnesses:
WM. H. RIBLET,
MORTIMER J. ENNIS.